United States Patent
Akel et al.

(10) Patent No.: US 6,328,214 B1
(45) Date of Patent: Dec. 11, 2001

(54) OPTO-ELECTRONIC DEVICE FOR ACQUISITION OF IMAGES OF CODES IN ONE AND TWO DIMENSIONS

(75) Inventors: Khalid El Akel; Christophe Dumontier, both of Castanet; Patrick Reuze, Toulouse; Serge Thuries, Saint Jean; Jean-Michel Puech, Toulouse; Jean-Louis Massieu, Montauban, all of (FR)

(73) Assignee: Intermec IP Corporation, Woodland Hills, CA (US)

( * ) Notice: Subject to any disclaimer, the term of this patent is extended or adjusted under 35 U.S.C. 154(b) by 0 days.

(21) Appl. No.: 09/490,706

(22) Filed: Jan. 24, 2000

(30) Foreign Application Priority Data

Jan. 22, 1999 (FR) .................................................. 99 00717

(51) Int. Cl.$^7$ ............................... G06K 7/10; G06K 9/38
(52) U.S. Cl. .............................. 235/462.27; 235/462.25; 235/462.27; 235/462.24; 235/462.1; 235/462.41; 235/462.23; 235/462.11
(58) Field of Search ........................... 235/462.1, 462.11, 235/462.25, 462.27, 462.24, 462.41, 462.23, 462.8

(56) References Cited

U.S. PATENT DOCUMENTS

| | | |
|---|---|---|
| 5,144,118 | 9/1992 | Actis et al. |
| 5,155,343 * | 10/1992 | Chandler et al. ................. 235/462 |
| 5,319,181 * | 6/1994 | Shellhammer et al. ............ 235/462 |
| 5,378,881 * | 1/1995 | Adachi ............................... 235/462 |
| 5,396,054 * | 3/1995 | Krichever et al. ................. 235/462 |
| 5,414,250 * | 5/1995 | Swartz et al. ..................... 235/462 |
| 5,600,119 * | 2/1997 | Dvorkis et al. ................... 235/462 |
| 5,654,533 | 8/1997 | Suzuki et al. |
| 5,691,528 * | 11/1997 | Wyatt et al. ...................... 235/462 |
| 5,703,348 * | 12/1997 | Suzuki et al. ..................... 235/472 |
| 5,710,417 * | 1/1998 | Joseph et al. ..................... 235/462 |
| 5,780,831 * | 7/1998 | Seo et al. .......................... 235/462 |
| 5,786,582 * | 7/1998 | Roustaei et al. .................. 235/462 |
| 5,912,452 * | 6/1999 | Wiklof et al. ................. 235/472.01 |
| 5,988,506 * | 11/1999 | Schaham et al. ............... 235/462.1 |
| 6,000,614 * | 12/1999 | Yang et al. ....................... 235/460 |
| 6,088,482 * | 7/2000 | He et al. ....................... 235/494 X |
| 6,135,353 * | 10/2000 | Konosu et al. ............... 235/462.09 |
| 6,176,429 * | 1/2001 | Reddersen et al. ........... 235/462.25 |

FOREIGN PATENT DOCUMENTS

WO 98/16896 4/1998 (WO) .

* cited by examiner

*Primary Examiner*—Karl D. Frech
*Assistant Examiner*—Daniel I. Walsh
(74) *Attorney, Agent, or Firm*—Seed IP Law Group PLLC

(57) ABSTRACT

The invention concerns an oplo-electronic device for acquisition of images of codes in one and two dimensions, comprising an electronic sensor constituted by a high-resolution photosensitive matrix, an analog/digital converter to convert the data emitted from the electronic sensor, and an image acquisition and processing module, comprising a preprocessing module and two processing modules, forming a pipe-line type architecture. The preprocessing module, acts in synchronous mode on the flow of digital data and implements simple image-processing operations. A number of cabled processing units can form the preprocessing modules. The processing modules, are constituted by programmable modules acting in asynchronous mode on the data emitted from the preceding module and stored in alternative manner in two memory blocks. The programmable modules are programmed to perform processing operations culminating in the obtaining of normalized data that are representative of the information "coded" in the captured code.

6 Claims, 3 Drawing Sheets

Figure 1:
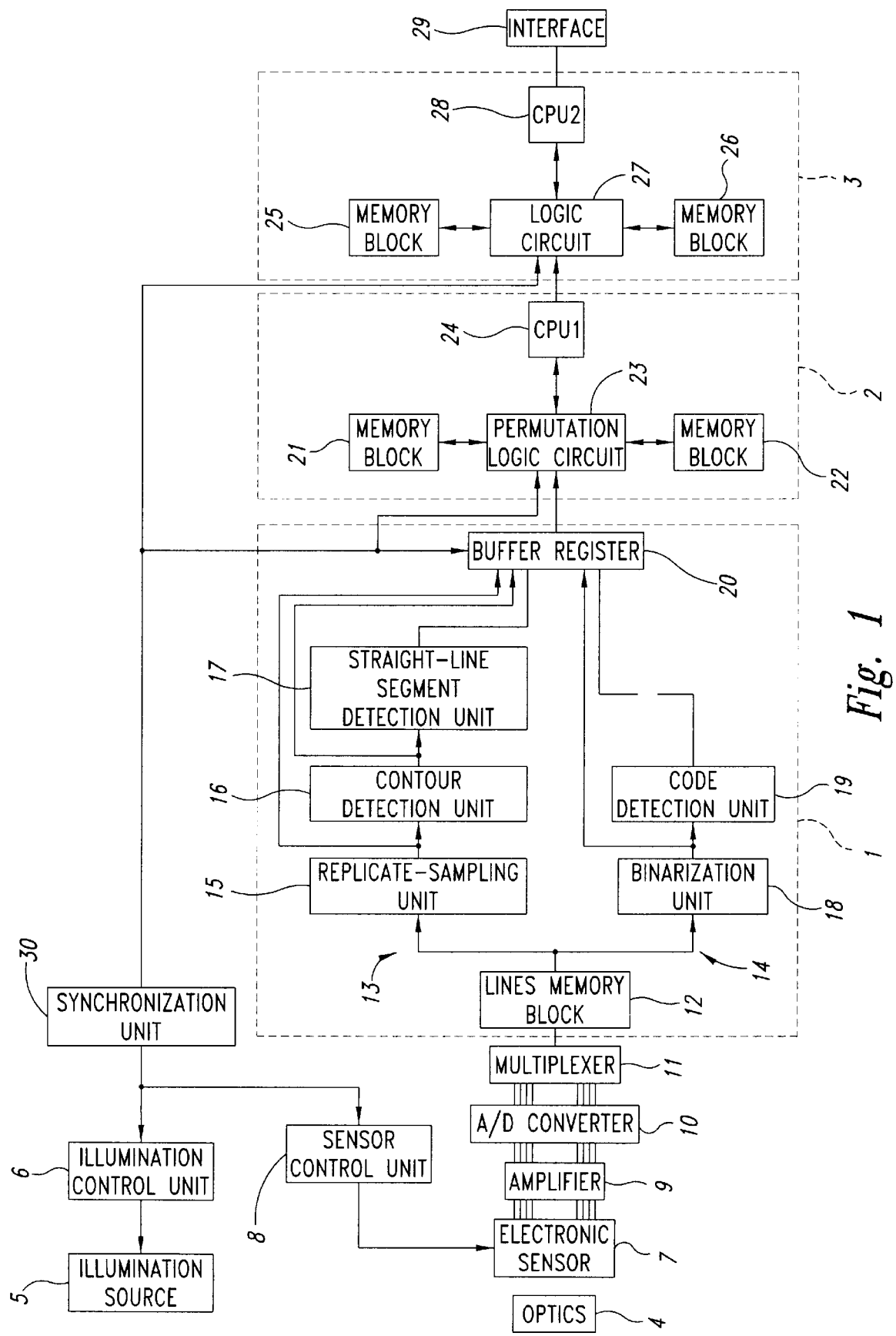

|   | t-1 | t | t+1 |
|---|---|---|---|
| A | Module(1) → MEM (21) | Module(1) → MEM (22) | Module(1) → MEM (21) |
| B | MEM(22) → CPU(24) → MEM(25) | MEM(21) → CPU(24) → MEM(26) | MEM(22) → CPU(24) → MEM(25) |
| C | MEM(26) → CPU(28) | MEM(25) → CPU(28) | MEM(26) → CPU(28) |

*Fig. 3*

|   | t-1 | t | t+1 |
|---|---|---|---|
| SENSOR | I (t-1) | I (t) | I (t+1) |
| CAN | I (t-1) | I (t) | I (t+1) |
| CPU1 | I (t-2) | I (t-1) | I (t) |
| CPU2 | I (t-3) | I (t-2) | I (t-1) |

*Fig. 4*

OPTO-ELECTRONIC DEVICE FOR ACQUISITION OF IMAGES OF CODES IN ONE AND TWO DIMENSIONS

BACKGROUND OF THE INVENTION

1. Field of the Invention

The invention concerns an opto-electronic device for acquisition of images of codes in one and two dimensions.

2. Description of the Related Art

Numerous types of two-dimensional codes have been in use for some years. The main advantage of this new type of code in relation to the traditional bar codes (1D or stacked 1D) is that it contains a much greater density of recorded information for the same useful surface.

The appearance of this new generation of codes has, of course, led to the realization of new types of opto-electronic devices, or readers, which are capable of processing the two-dimensional codes while retaining the possibility of processing the conventional bar codes.

Such readers comprise, firstly, an electronic sensor for acquisition of images of variable size (CDD technology or other), an illumination source to illuminate the codes and to permit the acquisition of the images on the electronic sensor, and an image-processor adapted to control the electronic sensor and the illumination source and to ensure the decoding of the images formed on said electronic sensor.

Moreover, the acquisition and processing of the images of the current readers are principally composed:

- of a conversion module permitting the images emitted from the electronic sensor to be digitized, that is to say, permitting this image to be coded in a certain number of levels of gray, generally 256, and permitting a constant flow of digitized data to be provided at the pixel frequency,
- of a memory module permitting the storage of the digitized data and comprising one or more image planes,
- and of a processing module performing the set of operations necessary for reading and decoding the two-dimensional code.

On the basis of such an architecture the current portable opto-electronic devices operate on matrices having a maximum size of about 800×600 pixels at a rate on the order of three images per second. However, as a result of the constant progress made by the micro-electronic industry, offering ever more significant possibilities and powers of calculation, new devices possessing enhanced performance characteristics in terms of rate of calculation are in the course of development. A gain in some units on the order of a factor of 5 has been announced.

However, it is advisable to note that this possibility for enhancing performance characteristics in terms of rate of calculation turns out to be limited in practice on account of the architecture, described above, of the image acquisition and processing module, by reason of the time needed by the processing module to perform, between two acquisitions, the reading and decoding operations for each captured code.

Furthermore, there is, on the other hand, no rational solution at the present time permitting the size of the processed images to be notably increased. The increase in the size of the processed images actually turns out to be much more problematic, for the calculating power necessary for the processing increases as the square of the enlargement factor of the original image: doubling the size of the image therefore necessitates a quadrupling of the calculating power.

Now, for the architecture, described above, of the current opto-electronic devices any increase in the calculating power is translated into a notable increase in the necessary memory size, and therefore into a notable increase, on the one hand, in the requirements in terms of electrical consumption, and on the other hand in the necessary volume for installation of the memory blocks.

In practice such constraints of physical nature and of consumption explain, particularly with regard to the portable opto-electronic devices, the limitation of the size of the matrices to the values stated above, that is, to say, 800×600 pixels.

However, it turns out that the two-dimensional codes tend to "code" more and more information, but on surfaces that are more and more reduced, so the increase in the maximum size of the matrices appears to be absolutely essential.

SUMMARY OF THE INVENTION

Aspects of the present invention are directed to the above problem, and therefore address an opto-electronic device, in particular a portable opto-electronic device, which is capable of operating on images of significant size, in particular of a size on the order of four times greater than that of the current images.

Another aspect of the invention is to provide an opto-electronic device possessing enhanced performance characteristics in terms of rate of calculation in relation to those of the current highest-performing devices.

To this end, certain aspects of the invention are directed towards an opto-electronic device for acquisition of images of codes in one and two dimensions comprising an electronic sensor, optics permitting images to be formed on said electronic sensor, an illumination source adapted to illuminate the codes and to permit the acquisition of the images on the electronic sensor, and an image acquisition and processing module, adapted to control the electronic sensor and the illumination source and to ensure the decoding of the images formed on the sensor.

According to the invention this opto-electronic device is characterized in that:

- the electronic sensor is constituted by a high-resolution photosensitive matrix of size $T = n \times n$ pixels, adapted to supply at a pixel frequency f a stream of data that are representative of the images formed on said electronic sensor,
- the image acquisition and processing module comprises a data converter including:
    - an analog/digital converter to convert the analog data emitted from the photosensitive matrix into a stream of digital data coded in a predetermined number of levels of gray,
    - a preprocessing module including, for example, cabled processing units, adapted to ensure low-level processing of the stream of digital data and to provide, on the one hand, a binarized representation of the images formed on the electronic sensor and, on the other hand, primary data which are characteristic of the captured codes, the preprocessing module also including a buffer register for temporary storage of the binarized images and of the primary data,
    - a first programmable processing module comprising:
        - two memory blocks,
        - a logic circuit for management of the memory blocks, adapted to configure, in alternative manner, one of the memory blocks in a mode for writing the data emitted from the buffer register and the other memory block in a mode for reading the data stored therein, and a programmable unit, of processor type, which is programmed from the data stored in the memory block configured in reading mode, in order to test for the presence or absence of a valid code, to locate each valid code, to identify each type of code, to determine, if need be, the priority of the code to be processed, to edit and normalize each valid code, and a second programmable processing module comprising:

two memory blocks, a logic circuit for management of the memory blocks, adapted to configure, in alternative manner, one of the memory blocks in a mode for writing the data emitted from the first programmable module and the other memory block in a mode for reading the data stored therein, and a programmable unit, of processor type, which is programmed from the data stored in the memory block configured in reading mode, in order to decode said data so as to supply normalized data that are representative of each captured code.

The image acquisition and processing module includes, firstly, of three modules, a preprocessing module and two processing modules, forming an architecture of pipe-line type: each module uses solely the data provided by the preceding module and provides data only to the following module. Moreover, these three distinct modules can be grouped together into two types:

a preprocessing module in the form of cabled processing units, acting in synchronous mode at the pixel frequency on the flow of the data emitted from the digitization stage and implementing simple operations for processing of images permitting a quantity of information to be obtained at the output of the preprocessing module that is sufficient for obtaining the subsequent decoding of the images but nonetheless clearly less than the quantity of information that storage of the initial image would necessitate, programmable modules acting in asynchronous mode on the data emitted from the preceding module and stored in alternative manner in two memories and realizing more complex processing operations culminating in the obtaining of normalized data that are representative of the information "coded" in the captured codes.

Such a hybrid architecture combining an architecture of pipe-line type with data-processing operations performed either in synchronous mode (preprocessing module) or in asynchronous mode (programmable modules) leads to activation at any instant of the various processing units of said modules and permits processing of the images to be realized in real time.

In practice such an architecture thus permits processing, for example, of the images of size 1,500×1,500 pixels at a rate of 30 images per second. Moreover, the requisite size of the memory blocks of the acquisition and processing module is relatively modest, so that the latter are able to equip a portable opto-electronic device.

According to another characteristic of the invention the photosensitive matrix comprises several parallel outputs and the data converter including the analog/digital converter are adapted to digitize in parallel the data supplied at each output of the photosensitive matrix and comprise a multiplexer adapted to supply the digital data in series.

In view of the significant stream of data emitted from the electronic sensor this arrangement permits the avoidance of possible "bottleneck" problems at the level of the analog/digital conversion of said data.

According to another characteristic of the invention the preprocessing module comprises:

a lines memory block, adapted to store the digital data in the form of a drop window of (x) consecutive lines each comprising n pixels, a binarization circuit adapted to code the digital data in binary form as a function of an open-ended threshold calculated for each datum processed, taking account of the neighborhood of the (x, x) data surrounding said datum.

Moreover, the preprocessing module preferentially comprises a detection circuit adapted to identify, from the binary data emitted from the binarization circuit, specific signatures of two-dimensional codes such as, in particular, the codes MAXICODE, AZTEC, QR, Code ONE.

According to another characteristic of the invention the preprocessing module comprises, downstream of the lines memory block, two preprocessing submodules arranged in parallel between said memory block and the buffer register:

a first processing submodule comprising the binarization circuit and the circuit for detection of signatures and adapted to supply a binary image and the Cartesian coordinates of the specific signatures of the codes to the buffer register, a second processing submodule comprising successively:

a replicate-sampling circuit capable of reducing the size T of the image formed on the photosensitive matrix and adapted to supply said reduced image to the buffer register, a circuit for detection of the contours in the reduced image emitted from the replicate-sampling circuit, adapted to supply images of said contours coded in one bit to the buffer register, and a circuit for detection of the straight-line segments in the reduced image, adapted to supply the start and end coordinates and the orientation of said straight-line segments to the buffer register.

Furthermore, each memory block of the first programmable module advantageously comprises three blocks in which there are stored respectively:

the binary image, the reduced image and the image of the contours, the data relating to the straight-line segments and to the specific signatures of the codes.

Other characterist, aims and advantages of the invention will become apparent from the detailed description which follows with reference to the attached drawings which represent a preferred embodiment of said invention by way of non-limiting example. In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

Figure 2:
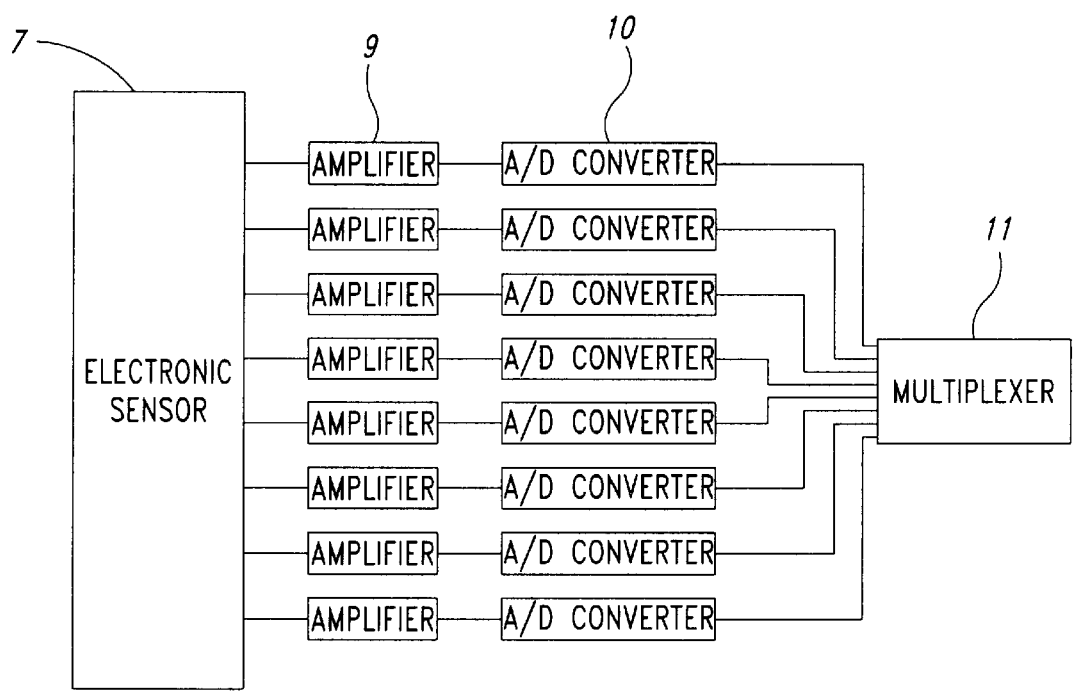

In these drawings, which form an integral part of the present description:

FIG. 1 is a function diagram of an opto-electronic device conforming to the invention, FIG. 2 is a detailed function diagram of the conversion module for conversion of the data emitted from the electronic sensor, FIG. 3 is a diagram representing the successive configurations of the memory blocks of the opto-electronic device according to the invention, and FIG. 4 is a diagram representing the stages of processing of successive images.

DETAILED DESCRIPTION

In the following description, certain specific details are set forth in order to provide a through understanding of various embodiments of the invention. However, one skilled in the art will understand that the invention may be practiced without these details. In other instances, well-known structures associated with automatic data collection devices such as bar code readers and other image processors have not been shown or described in detail to avoid unnecessarily obscuring descriptions of the embodiments of the invention.

The opto-electronic device represented in FIG. 1 is adapted to ensure the processing of images of codes in 1 or 2 dimensions, exhibiting a size of 1,500×1,500 pixels at a rate of 30 images per second.

To this end, the architecture of the image acquisition and processing module of this opto-electronic device is an architecture of pipe-line type composed of distinct modules, on the one hand utilizing solely the data provided by the preceding module, and on the other hand providing data solely to the following module. These modules are of two types:

- hardware modules acting in synchronous mode on the flow of data that are representative of the images. These modules implement simple image-processing operations and can be realized by cabled processing units and grouped together in a preprocessing module 1,
- software modules acting in asynchronous mode on data stored in memory, represented by function blocks 2 and 3 in FIG. 1. The operations carried out by these modules are more complex and call upon programmable operations of processor type.

As represented in FIG. 1, this opto-electronic device comprises, firstly:

- optics 4 to form images on an electronic sensor,
- an illumination source 5 capable of supplying an incident illumination beam and controlled by a control unit 6.

The optics 4 and the illumination source 5 may be of any type known such as lenses, mirrors, filters, lasers, or light emitting diodes for example, or as described in the French patent application Serial No. 99.00718 filed by the applicant on Jan. 22, 1999.

As for the electronic sensor 7, it is constituted by an "APS" photosensitive matrix, 1,500×1,500 pixels, provided with eight parallel outputs and adapted to supply data at each output at a pixel frequency of 14 MHz. This electronic sensor 7 is furthermore controlled by a control unit 8. Other imagers may also be suitable.

The opto-electronic device also includes a data converter to convert the data supplied at the eight outputs of the electronic sensor 7. As represented in FIG. 2, the data converter comprises:

- for each output of the electronic sensor, an amplifier such as 9 and an analog/digital converter such as 10 adapted to supply a digital signal coded in eight bits (256 levels of gray),
- a multiplexer 11 adapted to supply to the preprocessing module 1 on a single channel a flow of data coded in eight bits.

The preprocess in module 1 comprises, firstly, as represented in FIG. 1, a lines memory block 12 in which there are stored drop windows of five consecutive lines each of 1,500 pixels.

The preprocessing module 1 also comprises two preprocessing submodules 13, 14 arranged in parallel so as to act, in each instance, in synchronous manner on the flow of data emitted from the memory block 12 at an operating frequency determined by the pixel frequency.

The first of these preprocessing submodules 13 comprises, firstly, a replicate-sampling unit 15 in which the size T of the initial image is divided according to the pyramidal method of BURT so as to obtain an image of reduced size T/4 and then T/16.

The first preprocessing submodule 13 subsequently comprises a unit 16 for detection of the contours, operating on the reduced image of size T/16 emitted from the replicate-sampling unit 15.

The first preprocessing submodule 13 comprises, finally, a unit 17 for detection of the straight-line segments, operating on the reduced image of size T/16 emitted from the replicate-sampling unit 15 and permitting coordinates of the start and end points of the various straight-line segments which are present in said reduced image to be provided, as well as a histogram of the orientations of these lines. The process for processing the reduced image permitting these varied data to be obtained is described in detailed manner in the patent application relating to a process and to a device for detection of straight-line segments which has been filed jointly with the present application in the name of the applicant and claiming priority from French patent application 99.00718 filed Jan. 22, 1999.

The second preprocessing submodule 14 comprises, firstly, a unit 18 for binarization of the initial image which is capable of transforming the pixels coded in 256 levels of gray into pixels coded at two levels by utilizing an open-ended threshold as a function of the neighborhood of the processed pixel (5×5 matrix surrounding this pixel).

This second preprocessing submodule 14 comprises, moreover, a unit 19 for detection of the specific signatures of the codes in two dimensions, such as the codes MAXICODE, AZTEC, QR Code ONE, utilizing the conventional methods described in the standards published by AIM INTERNATIONAL Inc.

The preprocessing module 1 comprises, finally, a buffer register 20 in which all the data emitted from the preprocessing submodules 13, 14 are temporarily stored, namely:

- the binary image emitted from the binarization unit 18,
- the Cartesian coordinates of the specific signatures of the codes, emitted from the detection unit 19, the pyramidal image of size T/16 coded in 8 bits, emitted from the replicate-sampling unit 15,
- the image of the contours coded in one bit, emitted from the detection unit 16,
- and the start and end coordinates and the orientation of the straight-line segments, emitted from the detection unit 17.

The set of these data, which prove to be four times less voluminous than those represented by the storage of the initial image (512 kb as against 2.25 Mb), is then processed in asynchronous manner with regard to the initial flow by a first software module 2 comprising, firstly, for this purpose:

- two memory blocks 21, 22 each divided up into three blocks in which there are stored respectively:
  the binary image,
  the pyramidal image and the image of the contours,
  the data relating to the straight-line segments and to the specific signatures of the codes,
- a logic circuit 23 for permutation permitting the data emitted from the buffer register 20 to be written alternatively to the one and then the other memory block 21, 22 and simultaneously to be read in the other memory block 22, 21.

The first software module 2 comprises, moreover, a processor 24 which is adapted to operate at a higher frequency than the pixel frequency and programmed from the data stored in the memory block 21 or 22 configured in reading mode by the logic circuit 23 in order to:

test for the presence or absence of a valid code in the captured image, locate precisely one (or more) valid code(s), identify the type(s) of code, determine, if need be, the priority of the code to be processed in case several codes are present, edit and normalize the valid code(s).

The first software module 2 permits further reduction of the quantity of information which is necessary for the decoding and which is processed in asynchronous manner in the second software module 3 comprising:

two memory blocks 25, 26, a logic circuit 27 for permutation. of the configuration of the memory blocks 25, 26, and a processor 28 operating at a frequency identical to that of the processor 24 and programmed to:

decode the information emitted from the preceding stage, correct possible errors induced along the processing chain, and provide the translated code in normalized form to an interface 29.

The opto-electronic device comprises, finally, a synchronization circuit 30 linked respectively to the control units 6 and 8 and to the logic circuits for permutation 23, 27 and adapted to obtain successive configurations of the memory blocks 21, 22, 25, 26 as represented in FIG. 3, leading to processing of the successive images acquired by the electronic sensor 7 as illustrated in FIG. 4.

In FIG. 3, each of the three columns represents three different successive intervals of time (t−1, t, t+1) for the operation of the opto-electronic device. Each of the three rows (A, B, C) represents operations performed on the image data for the particular interval. The first software module 2 alternates between storing the preprocessed image data between the memory blocks 21 and 22. Thus, for example, at a first interval t−1 image data from the preprocessing module 1 is stored in the memory block 21, while at a second successive interval t the image data from the preprocessing module 1 is stored in the memory block 22. The second software module 3 alternates between storing the processed image data between the memory blocks 25, 26. Thus, for example, during the first interval t−1 the second software module 3 reads the preprocessed image data from the memory block 22, processes the image data and stores the processed image data to memory block 25, while at the second interval t the second software module 3 reads the preprocessed image data from the memory block 21, processes the image data and stores the processed image data to the memory block 26. The CPU 28 alternatively reads processed image data from the memory blocks 25 and 26. Thus, for example, during the first interval t−1 the CPU 28 reads the processed image data from memory block 26, while during the second interval t the CPU 28 reads the processed image data from memory block 25.

This operation is further illustrated in FIG. 4 which sets out in rows the various components of the opto-electronic device and sets out in columns the successive sets of image data on which the various components operate. Thus, for example, the first row represents the sensor 7 which successively acquires the image data I(t−1) during the first interval t−1, the image data I(t) during the second interval t, and the image data I(t+1) during the third interval t+1. Similarly, the last row represents the processor 28, which successively processes image data I(t−3) during the first interval t−1, the image data I(t−2) during the second interval t, and the image data I(t−1) during the third interval t+1. The image data I(t−3) and I(t−2) was acquired during intervals t−3 and t−2, preceding the interval t−1. Thus, the image data is successively processed by the various components of the opto-electronic device.

Similar subject matter is described in commonly assigned French patent applications 99.00717 and 99.00718, each filed Jan. 22, 1999, and in U.S. patent application Ser. No. 09/490,626, filed Jan. 24, 2000, and entitled "PROCESS AND DEVICE FOR DETECTION OF STRAIGHT-LINE SEGMENTS IN A STREAM OF DIGITAL DATA THAT ARE REPRESENTATIVE OF AN IMAGE IN WHICH THE CONTOUR POINTS OF SAID IMAGE ARE IDENTIFIED".

Although specific embodiments of and examples for the reader and method of the invention are described herein for illustrative purposes, various equivalent modifications can be made without departing from the spirit and scope of the invention, as will be recognized by those skilled in the relevant art. The teachings provided herein of the invention can be applied to readers for any machine-readable symbology, not necessarily the exemplary bar code reader generally described above.

The various embodiments described above can be combined to provide further embodiments. All of the above patents, patent applications and publications referred to in this specification are incorporated by reference. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all symbol readers that operated in accordance with the claims to read machine-readable symbols. Accordingly, the invention is not limited by the disclosure, but instead its scope is to be determined entirely by the following claims.

We claim:

1. An opto-electronic device for acquisition of images of codes in one and two dimensions, comprising:

an electronic sensor;

optical means permitting images to be formed on said electronic sensor, illumination means adapted to illuminate the codes and to permit the acquisition of the images on the electronic sensor;

means for acquisition and processing of the images, adapted to control the electronic sensor and the illumination means and to ensure decoding of the images formed on said electronic sensor, wherein:

the electronic sensor is constituted by a high-resolution photosensitive matrix of size T=n×n pixels, adapted to supply at a pixel frequency f a stream of data that are representative of the images formed on said electronic sensor, the means for acquisition and processing of the images comprise:

means for analog/digital conversion of the stream of data emitted from the photosensitive matrix, adapted to digitize the stream of data and supply a stream of digital data coded in a predetermined number of levels of gray, a preprocessing module realized by means of cabled processing units and adapted to ensure low-level processing of the stream of digital data and to provide, on one hand, a binarized representation of the images formed on the electronic sensor and, on another hand, of primary data which are characteristic of the codes, said preprocessing module comprising a buffer register for temporary storage of the binarized representation of the images and of the primary data, a first programmable processing module comprising:
two memory blocks,
a logic circuit for management of the memory blocks, adapted to configure, in alternative manner, one of the memory blocks in a mode for writing data emitted from the buffer register and the other memory block in a mode for reading data stored therein,
and a programmable unit, of processor type, which is programmed from data stored in the memory block configured in reading mode, in order to test for presence or absence of a valid code, to locate each valid code, to identify each type of code, to determine, if need be, priority of the code to be processed, to edit and normalize each valid code, and a second programmable processing module (3) comprising:
two memory blocks,
a logic circuit for management of the memory blocks, adapted to configure, in alternative manner, one of the memory blocks in a mode for writing data emitted from the first programmable module and the other memory block in a mode for reading data stored therein,
and a programmable unit, of processor type, which is programmed from data stored in the memory block configured in reading mode, in order to decode said data so as to supply normalized data that are representative of each captured code.

2. The opto-electronic device as set forth in claim 1, wherein:
the photosensitive matrix comprises several parallel outputs,
the analog/digital conversion means are adapted to digitize in parallel data supplied at each output of the photosensitive matrix and comprise a multiplexer adapted to supply the digital data in series.

3. The opto-electronic device as set forth in claim 1, wherein the preprocessing module comprises:
a lines memory block, adapted to store the digital data in the form of a drop window of (x) consecutive lines each comprising n pixels,
a binarization circuit adapted to code the digital data in binary form as a function of an open-ended threshold calculated for each datum processed, taking account of the neighborhood of (x, x) data surrounding said datum.

4. The opto-electronic device as set forth in claim 3, wherein the preprocessing module comprises a detection circuit adapted to identify, from the binary data emitted from the binarization circuit, specific signatures of two-dimensional codes.

5. The opto-electronic device as set forth in claim 4, wherein the preprocessing module comprises, downstream of the lines memory block, two preprocessing sub modules arranged in parallel between said memory block and the buffer register:
a first processing submodule comprising the binarization circuit and the circuit for detection of signatures and adapted to supply a binary image and Cartesian coordinates of the specific signatures of the two-dimensional codes to the buffer register,
a second processing submodule comprising successively:
a replicate-sampling circuit capable of reducing the size T of the image formed on the photosensitive matrix and adapted to supply said reduced image to the buffer register,
a circuit for detection of contours in the reduced image emitted from a replicate-sampling circuit, adapted to supply images of said contours coded in one bit to the buffer register,
and a circuit for detection of straight-line segments in the reduced image, adapted to supply start and end coordinates and orientation of said straight-line segments to the buffer register.

6. The opto-electronic device as set forth in claim 5, wherein each memory block of the first programmable module comprises three blocks in which there are stored respectively:
the binary image,
the reduced image and the image of the contours,
data relating to the straight-line segments and to the specific signatures of the two-dimensional codes.

* * * * *